US012700524B2

(12) United States Patent
Park et al.

(10) Patent No.: US 12,700,524 B2
(45) Date of Patent: Aug. 4, 2026

(54) ELECTROMAGNETIC SHIELDING COMPOSITE RESIN COMPOSITION AND HIGH-VOLTAGE SHIELDED WIRE COMPRISING SAME

(71) Applicants: HANWHA COMPOUND CORPORATION, Jeollanam-do (KR); YURA CO., LTD, Gyeonggi-do (KR)

(72) Inventors: Byoung Chul Park, Daejeon (KR); Joo Ho Lee, Gyeonggi-do (KR); Yong Won Lee, Gyeonggi-do (KR); Jae Hyun Hong, Daejeon (KR); Min Seong Kim, Daejeon (KR)

(73) Assignee: HANWHA COMPOUND CORPORATION, Jeollanam-Do (KR)

( * ) Notice: Subject to any disclaimer, the term of this patent is extended or adjusted under 35 U.S.C. 154(b) by 0 days.

(21) Appl. No.: 18/252,446

(22) PCT Filed: Jul. 6, 2021

(86) PCT No.: PCT/KR2021/008597
§ 371 (c)(1),
(2) Date: May 10, 2023

(87) PCT Pub. No.: WO2022/102904
PCT Pub. Date: May 19, 2022

(65) Prior Publication Data
US 2023/0411050 A1 Dec. 21, 2023

(30) Foreign Application Priority Data
Nov. 13, 2020 (KR) ........................ 10-2020-0151426

(51) Int. Cl.
*H01B 17/60* (2006.01)
*H01B 3/48* (2006.01)
(Continued)

(52) U.S. Cl.
CPC ............... *H01B 17/60* (2013.01); *H01B 3/48* (2013.01); *H01B 7/0208* (2013.01); *H01B 9/021* (2013.01); *H01B 19/04* (2013.01)

(58) Field of Classification Search
CPC ...................................................... H01B 9/027
See application file for complete search history.

(56) References Cited

U.S. PATENT DOCUMENTS 7,601,915 B2 * 10/2009 Lumachi .............. H01B 7/2813 156/54
2012/0277840 A1 * 11/2012 Flach ..................... A61N 1/056 607/116
(Continued)

FOREIGN PATENT DOCUMENTS

JP 2016-092380 * 5/2016
JP 2018-152249 A 9/2018
(Continued)

OTHER PUBLICATIONS

International search report and Written Opinion dated Mar. 3, 2022 for corresponding PCT/KR2021/008597 (9 pages).

*Primary Examiner* — Chau N Nguyen
(74) *Attorney, Agent, or Firm* — Carroll, Hoette & Butscher, LLC; Christopher R. Carroll

(57) ABSTRACT

The present invention relates to an electromagnetic shielding composite resin composition and a high-voltage shielded wire comprising the same. More particularly, the present invention relates to a high-voltage shielded wire comprising: a core composed of a conductive material; an insulation layer enveloping the core; an electromagnetic shielding layer surrounding the insulation layer and employing an electromagnetic shielding composite resin composition; and a coating layer covering the electromagnetic shielding layer and composed of an insulation material, wherein the electromagnetic shielding composite resin composition contains
(Continued)

a thermoplastic resin, a metal-coated carbon fiber, carbon black, and a carbon nanofiber.

9 Claims, 1 Drawing Sheet

(51) Int. Cl.

| | |
|---|---|
| ***H01B 7/02*** | (2006.01) |
| ***H01B 9/02*** | (2006.01) |
| ***H01B 19/04*** | (2006.01) |

(56) References Cited

U.S. PATENT DOCUMENTS

2020/0010588 A1* 1/2020 Kanaya .................. C08L 23/02
2020/0231739 A1* 7/2020 Jaehnigen .......... C08G 18/3237
2020/0315072 A1* 10/2020 Howland ................ B32B 15/20

FOREIGN PATENT DOCUMENTS

KR 10-2011-0104456 A 7/2012
KR 10-2016-0067335 A 6/2016
KR 10-2018-0089796 A 8/2018
KR 10-2020-0070788 A 6/2020

* cited by examiner

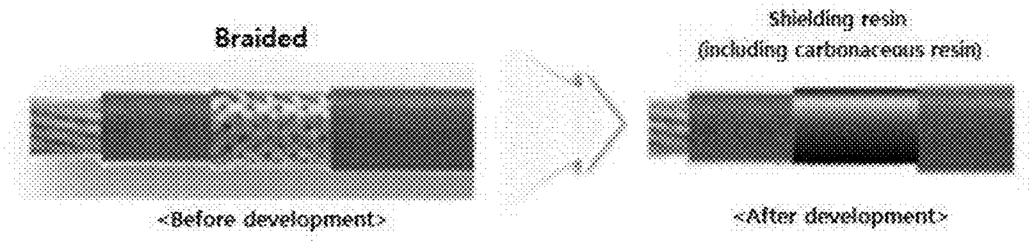
Braided
Shielding resin
(including carbonaceous resin)
<Before development>
<After development>

ELECTROMAGNETIC SHIELDING COMPOSITE RESIN COMPOSITION AND HIGH-VOLTAGE SHIELDED WIRE COMPRISING SAME

CROSS-REFERENCE TO RELATED APPLICATIONS

This application is a national phase entry of International Patent Application No. PCT/KR2021/008597 (filed 6 Jul. 2021), which claims priority to Korean Patent Application No. 10-2020-0151426 (filed 13 Nov. 2020), the entire disclosures of which are incorporated herein by reference.

BACKGROUND

Technical Field

The present invention relates to an electromagnetic shielding composite resin composition and a high-voltage shielded wire comprising the same.

Background Art

Conventionally, vehicle weight continues to increase due to stricter safety regulations and increased convenience specification, and an increase in vehicle weight leads to an increase in greenhouse gas emissions. With the acceleration of environmental regulation, the demand for lightness of major finished vehicles has increased every year, of which various materials are applied and promoted in the vehicle for lightness.

In particular, a vehicle cable included in the vehicle material may affect the increase in vehicle weight.

Accordingly, the cable wire requires not only essential functions of the cable such as flexibility, heat resistance, electromagnetic shielding, and insulation, but also lightness of the vehicle itself.

Recently, the use of electronic components has increased due to the electrification of the vehicle, and the voltage used in the vehicle has increased due to the development of eco-friendly vehicles. Accordingly, in order to prevent electromagnetic interference generated from the wire, high-voltage cables have been substituted for conventional vehicle cables. These high-voltage cables have a problem in that a weight of the wire is further increased because a metal braided wire is used to shield electromagnetic noise. Thus, not only the electromagnetic shielding properties of the high-voltage cable but also the lightness of the high-voltage cable is required.

BRIEF DESCRIPTION

An object of the present invention is to provide a high-voltage shielded wire composed of an electromagnetic shielding composite resin composition that is lightweight and has excellent shielding performance instead of a heavy metal braided in a shielding layer of a conventional high-voltage shielded wire.

In one general aspect, there is provided a high-voltage shielded wire including: a core composed of a conductive material; an insulation layer enveloping the core;

an electromagnetic shielding layer surrounding the insulation layer and employing an electromagnetic shielding composite resin composition; and a coating layer covering the electromagnetic shielding layer and composed of an insulation material, wherein the electromagnetic shielding composite resin composition contains a thermoplastic resin, a metal-coated carbon fiber, carbon black, and a carbon nanotube.

The thermoplastic resin may comprise any one or a mixture of two or more selected from the group consisting of polyvinyl chloride, polyethylene, polypropylene, polystyrene, polyurethane, ethylene vinyl acetate, ethylene propylene rubber, silicone rubber, polyether ester elastomer, polyether elastomer, polystyrene block copolymer, and polyamide elastomer.

The electromagnetic shielding composite resin composition may contain 5 to 50 parts by weight of metal-coated carbon fibers, 0.1 to 5 parts by weight of carbon black, and 0.1 to 5 parts by weight of carbon nanotubes, based on 100 parts by weight of the thermoplastic resin.

The metal coated on the metal-coated carbon fiber may contain any one or two or more selected from the group consisting of palladium, nickel, copper, silver, aluminum, and magnesium.

The electromagnetic shielding composite resin composition may further contain 0.1 to 5 parts by weight of an additive.

The additive may contain any one or two or more selected from the group consisting of antioxidants, lubricants, compatibilizers, colorants, release agents, flame retardants, and plasticizers.

The electromagnetic shielding composite resin composition may have an electromagnetic shielding efficiency of 30 dB or more, as measured by ASTM ES7 in a frequency band of 1 GHz.

The high-voltage shielded wire may further include a spiral winding conductor between the electromagnetic shielding layer and the coating layer.

The high-voltage shielded wire may further include a metal tape between the electromagnetic shielding layer and the coating layer.

The high-voltage shielded wire may have an electromagnetic shielding efficiency of 25 dB or more, as measured according to IEC 62153-4-6 based on a 3 MHz wire.

In another general aspect, a) preparing a matrix resin by kneading a thermoplastic resin, an antioxidant, a lubricant, and carbon black;
b) preparing a resin composite by adding and kneading metal-coated carbon fibers to the matrix resin; and
c) preparing an electromagnetic shielding composite resin composition by adding and kneading carbon nanotubes into the resin composite may be included.

Since the high-voltage shielded wire according to the present invention includes the electromagnetic shielding composite resin composition, it is possible to provide an electromagnetic interference high-voltage shielded wire that has excellent shielding performance and is lightweight.

The high-voltage shielded wire can have a production rate 17 times higher than that of a conventional metal braiding method that requires an additional weaving process, by enabling a polymer-specific extrusion process using the electromagnetic shielding composite resin composition in the shielding layer.

The electromagnetic shielding composite resin composition contains thermoplastic resins, metal-coated carbon fibers, carbon nanotubes, and carbon black, so that the shielding performance is excellent and the weight is about 20 to 30% lighter than that of the conventional metal braided wire.

Further, in addition to the electromagnetic shielding composite resin composition, a spiral winding conductor and a metal tape may be included, and since the electromagnetic shielding composite resin composition, the spiral winding conductor and the metal tape may be simultaneously molded by an extrusion process, the production speed is excellent, and the electromagnetic shielding efficiency can be further improved without an additional process.

BRIEF DESCRIPTION OF THE DRAWINGS

FIG. 1 is a schematic diagram illustrating a structure of a high-voltage wire having a shielding layer composed of an electromagnetic shielding composite resin composition instead of the conventional shielding layer composed of metal braid instead of the conventional shielding layer composed of metal braid.

DETAILED DESCRIPTION

Hereinafter, the present invention will be described in more detail with reference to embodiments and examples including accompanying drawings. The following specific examples and embodiments are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used in the description of the present invention are only for effectively describing certain embodiments, and are not intended to limit the present invention.

In addition, singular forms used in the detailed description and the claims are intended to include the plural forms unless otherwise indicated in context.

In addition, unless explicitly described otherwise, "including" any component will be understood to imply the inclusion of other components rather than the exclusion of other components.

In addition, the composition of the present invention refers to a weight ratio unless specifically limited.

Conventional high-voltage cables used copper braided wires in which tin-plated copper wires are woven to shield electromagnetic noise. The metal braided wire has poor productivity due to its very slow production speed of 2 to 3 m/min, and since the metal braided wire itself is made of a metal with a high specific gravity, it is heavier than conventional general cables and accounts for a large part of the increase in vehicle weight.

In order to solve the problems as described above, the present invention may provide a high-voltage shielded wire including: a core composed of a conductive material; an insulation layer enveloping the core; an electromagnetic shielding layer surrounding the insulation layer and employing an electromagnetic shielding composite resin composition; and a coating layer covering the electromagnetic shielding layer and composed of an insulation material, wherein the electromagnetic shielding composite resin composition contains a thermoplastic resin, a metal-coated carbon fiber, carbon black, and a carbon nanotube.

The high-voltage shielded wire may be composed of a core, an insulation layer, an electromagnetic shielding layer, and a coating layer in that order.

The electromagnetic shielding layer may use an electromagnetic shielding composite resin composition with low specific gravity and excellent mechanical strength, flexibility and conductivity instead of the conventional metal braided wire, thereby providing a thin and light electromagnetic shielding cable for vehicles.

According to one aspect of the present invention, the core of the high-voltage shielded wire may be composed of a conductive material, and the conductive material may contain copper, tin-plated copper, nickel-plated copper, silver-plated copper, an alloy of copper and tin, an alloy of copper and magnesium, aluminum, aluminum coated with copper, an aluminum alloy, an alloy of aluminum and magnesium coated with copper, iron coated with copper, etc. In addition, the core may be a single wire or a twisted strand in which several wires are twisted strand.

The core may have a calculated cross-sectional area of 1 to 10 $mm^2$, and preferably 3 to 8 $mm^2$, but the present invention is not limited thereto.

In addition, the insulating layer envelops the core, and the material constituting the insulating layer may be any one or a mixture of two or more selected from the group consisting of polyvinyl chloride, crosslinked polyvinyl chloride, polyethylene, crosslinked polyethylene, polyamide, polytetrafluoroethylene, fluorinated ethylene propylene, ethylene tetrafluoroethylene, polypropylene, crosslinked polypropylene, polyvinylidene fluorid, perfluoroalkoxy copolymer, thermoplastic polyurethane, thermoplastic polyether polyurethane, thermoplastic polyether ester elastomer, thermoplastic polyether elastomer, thermoplastic polystyrene block copolymer, thermoplastic polyamide elastomer, and silicone rubber, and preferably cross-linked polyethylene.

In particular, the cross-linked polyethylene is flexible and lightweight, has excellent corrosion resistance, and is suitable for use as an insulator because it does not undergo electrical corrosion. The shielding layer is composed of an electromagnetic shielding composite resin composition, so it is lightweight and can have an excellent shielding effect.

The electromagnetic shielding composite resin composition may be obtained by uniformly kneading thermoplastic resins, metal-coated carbon fibers, carbon black, and carbon nanotubes and performing extrusion molding.

The thermoplastic resin may be any one or a mixture of two or more selected from the group consisting of polyvinyl chloride, polyethylene, polypropylene, polystyrene, polyurethane, ethylene vinyl acetate, ethylene propylene rubber, silicone rubber, polyether ester elastomer, polyether elastomer, polystyrene block copolymer, and polyamide elastomer, preferably polypropylene, polyethylene, and polyurethane, and more preferably polyurethane.

In particular, the electromagnetic shielding composite resin composition containing polyurethane has excellent heat resistance, high elasticity, and strong chemical resistance, and has high frictional and bending strength, so it is easy to use for electric wires requiring flexibility.

In addition, when the electromagnetic shielding composite resin composition containing the polyurethane is prepared, the electromagnetic shielding composite resin composition may be mixed with metal-coated nanofibers, carbon black, and carbon nanotubes to exhibit high flexibility and excellent electromagnetic shielding efficiency, so it is very suitable for use in a shielding layer of a wire.

In addition, the polyurethane resin has a low specific gravity and is suitable for the purpose of lightening the wire.

In addition, according to one aspect of the present invention, the thermoplastic resin may have a weight average molecular weight of 1,000 g/mol to 1,000,000 g/mol, preferably 5,000 g/mol to 900,000 g/mol, and may be 10,000 g/mol to 700,000 g/mol, but the present invention is not limited thereto. The thermoplastic resin having the molecular weight as described above is used, and thus flowability and mechanical properties are more excellent, and the wire may be used for a long time due to increased flexibility and durability.

In addition, metal-coated carbon fiber is obtained by coating the surface of carbon fiber with metal by electroless plating method, and can have excellent conductivity and durability than conventional carbon fibers, and thus, the electromagnetic shielding efficiency of the electromagnetic shielding composite resin composition can be further enhanced.

In addition, the electromagnetic shielding composite resin composition may further contain the carbon black and carbon nanotubes, such that higher conductivity may be added to the electromagnetic shielding composite resin composition. In particular, the electromagnetic shielding composite resin composition further contains the carbon black, such that process stability may be secured during the preparation of the electromagnetic shielding composite resin composition.

The carbon black may be any one or a mixture of two or more selected from furnace black, acetylene black, thermal black, channel black, etc., but the present is not limited thereto.

The carbon nanotubes may be single-walled carbon nanotubes, double-walled carbon nanotubes, multi-walled carbon nanotubes, bundled carbon nanotubes, etc., but the present invention is not limited thereto.

The carbon nanotubes may have a diameter of 1 nm to 50 nm and a length of 10 nm to 20 pin, but the present invention is not limited thereto.

When the carbon nanotubes having a diameter and length within the ranges as described above are used, the resin composite has excellent electrical conductivity and processability.

The carbon nanotubes may have an aspect ratio of 100 to 1,000, and when the carbon nanotubes within the range as described above is included, the electromagnetic shielding composite resin composition may further improve electrical conductivity and electromagnetic shielding function.

According to one aspect of the present invention, the electromagnetic shielding composite resin composition may contain 5 to 50 parts by weight of metal-coated carbon fibers, 0.1 to 5 parts by weight of carbon black, 0.1 to 5 parts by weight of carbon nanotubes, and 0.1 to 3 parts by weight of additives, based on 100 parts by weight of the thermoplastic resin.

The electromagnetic shielding composite resin composition mixed in the composition ratio as described above can have more excellent electromagnetic shielding efficiency. In particular, the content of the metal-coated carbon fibers may be 5 to 50 parts by weight, preferably 10 to 40 parts by weight, and more preferably 20 to 30 parts by weight, based on 100 parts by weight of the thermoplastic resin, but the present invention is not limited. When the metal-coated carbon fibers are a part by weight within the range as described above, the shielding effect of the electromagnetic shielding composite resin composition may be more effectively increased.

Each component contained in the electromagnetic shielding composite resin composition will be described in detail.

The metal-coated carbon fibers contained in the electromagnetic shielding composite resin composition are obtained by coating carbon fiber with a metal, and has higher conductivity and durability than conventional carbon fibers, and thus may exhibit more excellent electromagnetic shielding efficiency.

The metal coating method may be an electroless method or an electrolytic coating method, but the present invention is not limited thereto.

In addition, the carbon fiber may have a diameter of 4 μm to 10 μm, and specifically, 5 μm to 8 μm. In addition, the carbon fibers may have a length of 1 mm to 10 mm, and specifically 3 mm to 8 mm. When the diameter and length of the carbon fibers are within the ranges as described above, it is easy to form a network structure and excellent processability can be obtained.

According to one aspect of the present invention, the metal coated on the metal-coated carbon fiber may be any one or a combination of two or more selected from copper, silver, gold, palladium, nickel, aluminum, and magnesium, and preferably copper, nickel, aluminum, and palladium.

By electroless coating carbon fibers with copper, nickel, aluminum, and palladium, more excellent conductivity and durability can be obtained. In particular, in the case of nickel, the price is relatively low and it can be used for a long time due to its excellent corrosion resistance.

Furthermore, when the electroless coating is performed, more excellent conductivity and durability can be obtained by coating the two metals in a single layer or in a multi-layer. For example, by combining nickel metal and copper metal, the carbon fiber is coated with in multi-layers, thereby improving corrosion resistance and conductivity at the same time, but the number and method of coating are not limited.

According to one aspect of the present invention, the electromagnetic shielding composite resin composition may further contain an additive, and any additive may be used as long as it is commonly used in the processing of a polymer.

According to one aspect of the present invention, the additive may contain any one or two or more selected from the group consisting of antioxidants, lubricants, compatibilizers, colorants, release agents, flame retardants, and plasticizers.

When the electromagnetic shielding composite resin composition is kneaded at a high temperature, an antioxidant may be selected to prevent deterioration due to oxidation.

According to one aspect of the present invention, the antioxidant may contain any one or more selected from phenol-based compounds and thioether-based compounds.

The phenol-based compound may include, but is not limited to, any one or two or more selected from the group consisting of 2,2'-thiodiethylene-bis-(3,5-di-tert-butyl-4-hydroxyphenyl)propionate, 4,4'-thio-bis-(2-tert-butyl-5-methylphenol), 1,2-dihydro-2,2,4-trimethylquinoline, diethyl((3,5-bis-(1,1-dimethyl ethyl)-4-hydroxyphenyl)methyl) phosphonate, 1,3,4-tris(4-tert-butyl-3-hydroxy-2,6-dimethylbenzene)-1,3,5-tri azine-2,4,6-(1H,3H,5H)-trion, tetrakis[methyl ene-3-(3,5-di-tert-butyl-4-hydroxyphenyl) propionate]methane, octadecyl-3-(3,5-di-tert-butyl-4-hydroxyphenyl)propionate, tris(2,4-ditert-butylphenyl)phosphate, and N,N'-bis-(3-(3',5'-di-tert-butyl-4'-hydroxyphenyl) propionyl)hydrazine.

In addition, the thioether-based compound may include, but is no limited to, any one or two or more selected from the group consisting of dilauryl thiodipropionate, ditridecyl thiodipropionate, dimyristyl thiodipropionate, dioctadecyl disulfide, bis[2-methyl-4-(3-n-dodecylthiopropionyloxy)-5-tert-butylphenyl]sulfide, pentaerythritol-tetrakis-(3-laurylthiopropionate), 1,4-cyclohexanedimethanol, 3,3'-thiobispropanoic acid dimethyl ester polymer, and distearyl thiodipropionate.

The antioxidant may be used to prevent deterioration of the thermoplastic resin by radicals generated during processing of the thermoplastic resin, and the antioxidant effect can be further increased when the phenol-based compound and the thioether-based compound are mixed and used, but the present invention is not limited thereto.

The electromagnetic shielding composite resin composition may further contain a lubricant, so that when the electromagnetic shielding composite resin composition is processed, the viscous behavior is improved, and the surface smoothness of the electromagnetic shielding composite resin composition after processing is excellent.

According to one aspect of the present invention, the lubricant may include one or more selected from the group consisting of montan wax, fatty acid ester, triglyceride, glycerin ester, polyethylene wax, propylene wax, paraffin wax, metal soap-based lubricant, and amide-based lubricant, but the present invention is not limited thereto, so long as it does not affect the electromagnetic shielding effect.

The high-voltage shielded wire is 20 to 30% lighter than a conventional wire using a metal braided wire as a shielding layer by using the electromagnetic shielding composite resin composition in the shielding layer, and has a more excellent shielding effect.

In addition, while the metal braided wire is manufactured through a weaving process and the production rate is very low, the electromagnetic shielding composite resin composition is prepared through an extrusion process, so that the production speed in processing of the high-voltage shielded wire is very excellent.

According to one aspect of the present invention, the electromagnetic shielding composite resin composition may have an electromagnetic shielding efficiency of 30 dB or more, preferably 40 to 90 dB, and more preferably 50 dB to 90 dB, as measured by ASTM ES7 in a frequency band of 1 GHz.

This is a significant effect that cannot be seen if the thermoplastic resin, metal-coated carbon fibers, carbon black, and carbon nanotubes are not all combined, and the shielding effect of the wire can be further enhanced by using the electromagnetic shielding composite resin composition prepared by the combination in the shielding layer of the wire.

According to one aspect of the present invention, the high-voltage shielded wire can further include a spiral winding conductor between the electromagnetic shielding layer and the covering layer, thereby increasing the electromagnetic shielding effect.

The spiral winding conductor is configured by winding a conductor such as copper or tin-plated copper on a core wire in the same direction, and the shielding layer composed of the electromagnetic shielding composite resin composition further includes the spiral winding conductor, such that a more excellent shielding effect can be obtained.

The spiral winding conductor can be used by mixing with the electromagnetic shielding composite resin composition, and in particular, has the advantage that extrusion molding is possible at the same time as the composition, thereby having excellent processability.

According to one aspect of the present invention, the high-voltage shielded wire may further include a metal tape between the electromagnetic shielding layer and the coating layer, thereby increasing the electromagnetic shielding effect.

The metal tape is a conductive material such as a copper metal tape or an aluminum metal tape, and is configured by winding the metal tape on a core wire. The shielding layer composed of the electromagnetic shielding composite resin composition can further include the metal tape to have a more excellent shielding effect.

The spiral winding conductor can be used by mixing with the electromagnetic shielding composite resin composition, and in particular, has the advantage that extrusion molding is possible at the same time as the composition, thereby having excellent processability.

In addition, the electromagnetic shielding composite resin composition included in the electromagnetic shielding layer may further include both the spiral winding conductor and the metal tape, such that the electromagnetic shielding effect can be further enhanced.

Furthermore, the spiral winding conductor and the metal tape may be molded simultaneously with an extrusion process of the electromagnetic shielding composite resin composition. Thus, it is possible to manufacture without a separate additional process.

In contrast, the conventional braided wire requires an additional weaving process with a low production speed, resulting in low productivity. In particular, the electromagnetic shielding layer composed of the braided wire is heavier and thicker than the electromagnetic shielding layer including the electromagnetic shielding composite resin composition, the spiral winding conductor, and the metal tape.

Meanwhile, when shielding is performed using only the spiral winding conductor and the metal tape in the electromagnetic shielding layer, the weight may be increased by 20 to 30% for the same shielding effect, and the diameter of the wire may also be increased by 10 to 20% compared to the same shielding effect when mixed with the electromagnetic shielding composite resin composition.

In addition, the coating is a layer surrounding the shielding layer and constitutes an outer layer of the wire to protect a cable core from an external environment, and any polymeric material having excellent thermal properties, mechanical properties, and chemical resistance may be used. For example, polyvinyl chloride, polyethylene, polyurethane, silicone rubber, etc. may be used, but is not limited thereto.

According to one aspect of the present invention, the high-voltage shielded wire may have an electromagnetic shielding efficiency of 25 dB or more, preferably 30 dB to 90 dB, and more preferably 45 dB to 80 dB, as measured according to IEC 62153-4-6 based on a 3 MHz wire.

This is a significant effect that the electromagnetic interference-shielding efficiency is exhibited by including the electromagnetic shielding composite resin composition in the electromagnetic shielding layer, and the shielding effect can be further enhanced by further including the spiral winding conductor and the metal tape in the electromagnetic shielding layer.

The electromagnetic shielding composite resin composition may be prepared in a total of three steps: introducing and kneading a thermoplastic resin, an antioxidant, a lubricant, and carbon black; introducing and kneading metal-coated carbon fibers, and then introducing and kneading carbon nanotubes. The electromagnetic shielding composite resin composition is prepared in the three steps as described above, such that kneadability between the electromagnetic shielding composite resin compositions is greatly increased, and a more uniform composition may be prepared.

According to one aspect of the present invention, a) preparing a matrix resin by kneading a thermoplastic resin, an antioxidant, a lubricant, and carbon black, b) preparing a resin composite by adding and kneading metal-coated carbon fibers into the matrix resin; and c) preparing an electromagnetic shielding composite resin composition by adding and kneading carbon nanotubes into the resin composite may be included.

In step a), a matrix resin may be prepared by simultaneously introducing a thermoplastic resin, an antioxidant, a lubricant, and carbon black into a twin-screw extruder and kneading at a temperature of 100 to 300° C.

In step b), a resin composite may be prepared by introducing metal-coated carbon fibers into the matrix resin through a side feeder into a secondary inlet of a twin-screw extruder. The metal-coated carbon fiber is a carbon fiber coated with metal by electroless plating, and the metal coating may be peeled off as the mixture is mixed at a high temperature for a long time, and thus the electromagnetic shielding effect can be deteriorated. In addition, since the metal-coated carbon fiber may aggregate with a composition such as carbon black, an antioxidant, and a lubricant, it is difficult to uniformly mix it in the matrix.

Accordingly, destruction and damage of the metal-coated carbon fibers may be prevented and each composition may be uniformly mixed by secondly adding the metal-coated carbon fibers to the matrix resin uniformly mixed in step a) and performing kneading at a temperature of 100 to 300° C.

In step c), an electromagnetic shielding composite resin composition may be prepared by introducing carbon nanotubes into the resin composite through a side feeder into a third inlet of a twin screw extruder and performing kneading at a temperature of 100 to 300° C.

In step c), the carbon nanotubes may prevent aggregation between carbon compounds such as carbon black, and thus the carbon nanotubes may be uniformly mixed into the electromagnetic shielding composite resin composition by mixing the carbon nanotubes with the resin composite through a side feeder.

The kneading temperature may be 100 to 300° C., preferably 150 to 250° C., and more preferably 180 to 230° C., but the present invention is not limited thereto. Hereinafter, the present invention will be described in more detail on the basis of Examples and Comparative Examples. However, the following Examples and Comparative Examples are only examples for describing the present invention in more detail, and the present invention is not limited by the following Examples and Comparative Examples.

Physical Property Evaluation

1) Electromagnetic Shielding Test of Specimen

The shielding rate measurement of a flat specimen was performed based on a procedure of ASTM ES7, the measurable frequency band was conducted at 3 GHz, and the evaluation frequency band was conducted at 1 GHz.

2) Electromagnetic Shielding Test of Cable

The shielding rate measurement of the cable was performed based on a procedure of IEC 62153-4-6 (Line Injection Method), and the measurable frequency band was conducted at 1 GHz, and the evaluation frequency band was conducted at 3 MHz.

3) Extrusion Moldability of Wire

After extrusion molding of the wire, the appearance and moldability of the wire were evaluated. The extrusion moldability was classified into grades in the order of E (Excellent), G (Good) and P (Poor). The value of the extrusion moldability satisfies the wire appearance and moldability from the G stage or more.

Example 1

A matrix resin was prepared by introducing 0.3 parts by weight of an antioxidant, which is a product of SONGNOX1010 from Songwon, 0.2 parts by weight of lubricant, which is a product of LC-102N (polyethylene wax) from Lion Chemtech, and 3 parts by weight of carbon black, which is Chezacarb AC-80 (Nitrogen Surface Area: min 800) from Unipetrol, based on 100 parts by weight of the polyurethane resin, into a primary raw material inlet of the twin screw extruder (L/D=40, diameter=27 mm) heated to 190° C.

A resin composite was prepared by introducing 12 parts by weight of nickel-coated carbon fiber having a length of 6 mm, which was sized with epoxy from Bullsone New Materials, based on 100 parts by weight of the urethane resin, into the secondary inlet of the twin screw extruder through the side feeder.

An electromagnetic shielding composite resin composition was prepared by introducing 1 part by weight of carbon nanotube (multi-walled carbon nano tube (MWCNT)), which is a product of a JENO TUBE 8A (diameter: 6 to 9 nm) from JEIO, based on 100 parts by weight of the urethane resin, into a tertiary inlet of the twin screw extruder through the side feeder, through a hot melt kneading process.

The electromagnetic shielding efficiencies of the specimens with the electromagnetic shielding composite resin composition thus prepared were measured and are shown in Table 1.

After manufacturing a wire composed of the electromagnetic shielding composite resin composition thus prepared as a shielding layer, the electromagnetic shielding efficiency of the wire was measured and shown in Table 1.

Example 2

Example 2 was performed in the same manner as in Example 1, except that the weight part of the nickel-coated carbon fiber was 19 parts by weight.

Example 3

Example 3 was performed in the same manner as in Example 1, except that the weight part of the nickel-coated carbon fiber was 26 parts by weight.

Example 4

Example 4 was performed in the same manner as in Example 1, except that the weight part of the nickel-coated carbon fiber was 33 parts by weight.

Example 5

Example 5 was performed in the same manner as in Example 1, except that 24 strands of 0.100 mm TA(Tin coated annealed copper wire) spiral winding conductor (conductor wire conforming to the KSC3101 standard) were further included in the shielding layer.

Example 6

Example 6 was performed in the same manner as in Example 1, except that an aluminum tape (Lotte Aluminum, A1235) was further included in the shielding layer.

Example 7

Example 7 was performed in the same manner as in Example 1, except that an aluminum tape (Lotte Aluminum, A1235) and 10 strands of 00.100 mm TA spiral winding conductor (conductor wire conforming to the KSC3101 standard) were further included in the shielding layer.

Example 8

A matrix resin was prepared by introducing 0.3 parts by weight of an antioxidant, which is a product of SONGNOX1010 from Songwon, 0.2 parts by weight of lubricant, which is a product of LC-102N (polyethylene wax) from Lion Chemtech, 12 parts by weight of nickel-coated carbon fiber having a length of 6 mm, which has been sized with epoxy from Bullsone New Materials, and 3 parts by weight of carbon black, which is Chezacarb AC-80 (Nitrogen Surface Area: min 800) from Unipetrol, based on 100 parts by weight of the polyurethane resin, into a primary raw material inlet of the twin screw extruder (L/D=40, diameter=27 mm) heated to 190° C.

An electromagnetic interference-shielding composite resin composition was prepared by introducing 1 part by weight of carbon nanotube (multi-walled carbon nano tube (MWCNT)), which is a product of a JENO TUBE 8A (diameter: 6 to 9 nm) from JEIO, based on 100 parts by weight of the urethane resin, into the secondary inlet of the twin screw extruder through the side feeder, through a hot melt kneading process.

The electromagnetic shielding efficiencies of the specimens with the electromagnetic shielding composite resin composition thus prepared were measured and are shown in Table 1.

After manufacturing a wire composed of the electromagnetic shielding composite resin composition thus prepared as a shielding layer, the electromagnetic shielding efficiency of the wire was measured and shown in Table 1.

Comparative Example 1

Comparative Example 1 was performed in the same manner as in Example 1, except that the nickel-coated carbon fibers were not included.

Comparative Example 2

Comparative Example 2 was performed in the same manner as in Example 1, except that 12 parts by weight of nickel nanopowder (Ni 99.9 wt %, 70 nm, US Research Nanomaterials) was included instead of the nickel-coated carbon fiber.

Comparative Example 3

Comparative Example 3 was performed in the same manner as in Example 1, except that the carbon black was not included.

Comparative Example 4

Comparative Example 4 was performed in the same manner as in Example 1, except that the carbon nanotubes were not included.

Comparative Example 5

Comparative Example 5 was performed in the same manner as in Example 1, except that an aluminum tape (Lotte Aluminum, A1235) and 36 strands of 0.100 mm TA spiral winding conductor (conductor wire conforming to KSC3101 standard) were included in the shielding layer instead of the shielding compound composition.

TABLE 1

| | Electromagnetic shielding evaluation of specimen (dB) | Electromagnetic shielding evaluation of wire (dB) | Extrusion moldability |
|---|---|---|---|
| Example 1 | 31.5 | 28.7 | E |
| Example 2 | 34.9 | 28.9 | G |
| Example 3 | 53.8 | 47.8 | G |
| Example 4 | 57.4 | 49.2 | P |
| Example 5 | 31.5 | 52.2 | G |
| Example 6 | 31.5 | 50.8 | G |
| Example 7 | 31.5 | 54.6 | G |
| Example 8 | 27.5 | 25.4 | G |
| Comp. Example 1 | 12.0 | 8.1 | E |
| Comp. Example 2 | 27.5 | 25.4 | G |
| Comp. Example 3 | 24.3 | 21.3 | G |
| Comp. Example 4 | 26.5 | 23.5 | G |
| Comp. Example 5 | 0 | 24.5 | G |

As shown in Table 1, it can be confirmed that Examples 1 to 7 using the electromagnetic shielding composite resin composition have a high electromagnetic shielding effect of 30 dB or more in the electromagnetic shielding evaluation of the specimen.

In addition, it could be confirmed that in the electromagnetic shielding evaluation of the wire, Examples 5 to 7 showed higher electromagnetic shielding efficiency when the spiral winding conductor and aluminum tape were mixed with the electromagnetic shielding composite resin composition.

More surprisingly, it could be confirmed that the wire of Example 7 in which the shielding layer was composed of the electromagnetic shielding composite resin composition, an aluminum tape and 10 strands of 00.100 mm TA spiral winding conductor, was 20% lighter in weight and increased the shielding efficiency by 50% or more than that of the wire of Comparative Example 5 in which the shielding layer was composed of only aluminum tape and 36 strands of 00.100 mm TA spiral winding conductor.

Hereinabove, although the present invention has been described by specific matters, the limited embodiments, and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A high-voltage shielded wire comprising:

a core composed of a conductive material;

an insulation layer enveloping the core;

an electromagnetic shielding layer surrounding the insulation layer and employing an electromagnetic shielding composite resin composition; and a coating layer covering the electromagnetic shielding layer and composed of an insulation material, wherein the electromagnetic shielding composite resin composition contains a thermoplastic resin, a metal-coated carbon fiber, carbon black, a carbon nanotube, and an additive, and wherein the thermoplastic resin comprises a polyurethane,
wherein the additive contains an antioxidant, and
wherein the antioxidant contains any one or more of a phenol-based compound or a thioether-based compound,
wherein the carbon fiber has a diameter of 4 μm to 10 μm,
wherein the carbon nanotube has an aspect ratio of 100 to 1,000, and wherein the metal-coated carbon fiber is coated with a multi-layer metal comprising nickel and copper.

2. The high-voltage shielded wire as claimed in claim 1, wherein the electromagnetic shielding composite resin composition contains 5 to 50 parts by weight of metal-coated carbon fibers, 0.1 to 5 parts by weight of carbon black, and 0.1 to 5 parts by weight of carbon nanotubes, based on 100 parts by weight of the thermoplastic resin.

3. The high-voltage shielded wire as claimed in claim 1, wherein the metal coated on the metal-coated carbon fiber contains any one or two or more selected from the group consisting of palladium, nickel, copper, silver, aluminum, and magnesium.

4. The high-voltage shielded wire as claimed in claim 1, wherein the electromagnetic shielding composite resin composition further contains 0.1 to 5 parts by weight of the antioxidant.

5. The high-voltage shielded wire as claimed in claim 4, wherein the additive also contains any one or more of a lubricant, a compatibilizer, a colorant, a release agent, a flame retardant, or a plasticizer.

6. The high-voltage shielded wire as claimed in claim 1, wherein the electromagnetic shielding composite resin composition has an electromagnetic shielding efficiency of 30 dB or more, as measured by ASTM ES7 in a frequency band of 1 GHz.

7. The high-voltage shielded wire as claimed in claim 1, further comprising a metal tape between the electromagnetic shielding layer and the coating layer.

8. The high-voltage shielded wire as claimed in claim 1, wherein the high-voltage shielded wire has an electromagnetic shielding efficiency of 25 dB or more, as measured according to IEC 62153-4-6 based on a 3 MHz wire.

9. A method for preparing the electromagnetic shielding composite resin composition of claim 1, the method comprising:

a) preparing a matrix resin by kneading the thermoplastic polyurethane elastomer, the phenol-based compound antioxidant, and carbon black;
b) preparing a resin composite by adding and kneading metal-coated carbon fibers having a diameter of 4 μm to 10 μm to the matrix resin, wherein the metal-coated carbon fibers are coated with a multi-layer metal comprising nickel and copper; and
c) preparing the electromagnetic shielding composite resin composition by kneading the carbon nanotubes having an aspect ratio of 100 to 1,000 to the resin composite.

* * * * *